United States Patent
Furukawa et al.

(10) Patent No.: US 10,439,479 B2
(45) Date of Patent: Oct. 8, 2019

(54) ELECTRIC DRIVE DEVICE

(71) Applicant: Mitsubishi Electric Corporation, Tokyo (JP)

(72) Inventors: Akira Furukawa, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 264 days.

(21) Appl. No.: 15/525,127

(22) PCT Filed: Jan. 23, 2015

(86) PCT No.: PCT/JP2015/051840
§ 371 (c)(1),
(2) Date: May 8, 2017

(87) PCT Pub. No.: WO2016/117114
PCT Pub. Date: Jul. 28, 2016

(65) Prior Publication Data
US 2018/0278135 A1    Sep. 27, 2018

(51) Int. Cl.
*H02K 11/00* (2016.01)
*H02K 29/08* (2006.01)
(Continued)

(52) U.S. Cl.
CPC .............. *H02K 29/08* (2013.01); *H02K 3/12* (2013.01); *H02K 3/28* (2013.01); *H02K 5/225* (2013.01);
(Continued)

(58) Field of Classification Search
CPC ........ H02K 11/33; H02K 11/01; H02K 11/02; H02K 11/215; H02K 3/12; H02K 5/225
(Continued)

(56) References Cited

U.S. PATENT DOCUMENTS

| 9,586,615 | B2 * | 3/2017 | Asao | B62D 5/0406 |
| 2008/0211356 | A1 | 9/2008 | Kataoka et al. | |
| 2009/0090574 | A1 * | 4/2009 | Kuno | B60L 58/12 180/65.265 |

(Continued)

FOREIGN PATENT DOCUMENTS

| EP | 2 808 982 A1 | 12/2014 |
| JP | 2008-219995 A | 9/2008 |

(Continued)

OTHER PUBLICATIONS

International Search Report for PCT/JP2015/051840 dated Apr. 21, 2015.

*Primary Examiner* — Hanh N Nguyen

(74) *Attorney, Agent, or Firm* — Sughrue Mion, PLLC; Richard C. Turner

(57) ABSTRACT

This invention is concerning connecting members which connect a motor and inverters and which are arranged symmetrically such that magnetic fields produced by three-phase alternating current flowing in the connecting members cancel each other out and are reduced at the position of a magnetic sensor, and furthermore the connecting members are arranged such that $F_{sum}=\sin(2\theta a+\pi/4)-\sin(2\theta b-\pi/12)+\sin(2\theta c-5\pi/12)$, and $F_{diff}=\sin(2\theta a-\pi/4)-\sin(2\theta b+\pi/12)+\sin(2\theta c+5\pi/12)$ satisfy relationships $F_{sum}<K$ and $F_{diff}<K$ with respect to a predetermined required value K.

8 Claims, 6 Drawing Sheets

(51) Int. Cl.
*H02K 11/02* (2016.01)
*H02K 11/215* (2016.01)
*H02K 11/33* (2016.01)
*H02K 3/12* (2006.01)
*H02K 3/28* (2006.01)
*H02K 5/22* (2006.01)
*H02K 11/01* (2016.01)
*H02P 27/06* (2006.01)

(52) U.S. Cl.
CPC ........... *H02K 11/02* (2013.01); *H02K 11/215* (2016.01); *H02K 11/33* (2016.01); *H02K 11/01* (2016.01); *H02P 27/06* (2013.01)

(58) Field of Classification Search
USPC .................................................. 310/71, 68 R
See application file for complete search history.

(56) References Cited

U.S. PATENT DOCUMENTS

| | | | | |
|---|---|---|---|---|
| 2012/0187893 | A1* | 7/2012 | Baba | H02P 25/024 318/722 |
| 2014/0145547 | A1* | 5/2014 | Nakano | H02K 21/16 310/216.069 |
| 2014/0191628 | A1 | 7/2014 | Nakano et al. | |
| 2015/0333600 | A1* | 11/2015 | Nakano | H02K 29/08 310/71 |

FOREIGN PATENT DOCUMENTS

| | | |
|---|---|---|
| JP | 2012-161112 A | 8/2012 |
| JP | 2013-007731 A | 1/2013 |
| WO | 2013/094075 A1 | 6/2013 |
| WO | 2013/111277 A1 | 8/2013 |

* cited by examiner (a) CROSS-SECTIONAL DIAGRAM (b) SIDE VIEW DIAGRAM

ELECTRIC DRIVE DEVICE

CROSS REFERENCE TO RELATED APPLICATIONS

This application is a National Stage of International Application No. PCT/JP2015/051840 filed Jan. 23, 2015, the contents of all of which are incorporated herein by reference in their entirety.

TECHNICAL FIELD

The present invention relates to an electric drive device provided with an ECU (Electronic Control Unit) which controls driving of a motor.

BACKGROUND ART

An electric drive device used in an electric power steering device, etc. is required to accurately detect the angular position of the rotor of a motor, in order to reduce torque ripples in the motor. However, there is a problem in that the effects of the magnetic field generated by the motor itself cause a decline in the detection accuracy of a magnetic sensor which detects the angular position of the rotor of the motor.

In a conventional electric drive device that seeks to solve this problem, the accuracy of detection of the angular position is improved by arranging a lid part between the motor armature and the magnetic sensor so as to suppress the effects of the magnetic field generated by the armature, on the sensor (see, for example, PTL 1).

Furthermore, there is a further electric drive device which is configured such that a magnetic sensor is capable of accurately detecting the magnetic field of a sensor magnet, by providing a magnetic induction part in contact with a holder which holds a sensor magnet (see, for example, PTL 2).

CITATION LIST

Patent Literature

[PTL 1] Japanese Patent Application Publication No. 2008-219995
[PTL 2] Japanese Patent Application Publication No. 2013-7731

SUMMARY OF INVENTION

Technical Problem

However, the prior art involves the following problems.
In the electric drive device of PTL 1, the magnetic field generated by the armature is prevented from affecting the sensor, by providing a lid part, but this requires the addition of the lid part as a new component. Furthermore, in the electric drive device of PTL 2, the effects of the magnetic field apart from the magnetic field that is to be detected are suppressed by providing magnetic induction parts. However, components that constitute the magnetic induction parts are required besides other components.

Since additional new components are required in this way, then problems arise in that the structure of the motor becomes more complicated, the weight and cost of the motor increase, and furthermore, productivity declines.

The present invention was devised in order to resolve problems such as that described above, an object thereof being to provide an electric drive device which is capable of detecting the angular position of a rotor of a motor, with high accuracy, by suppressing the effects of the magnetic field generated by the motor itself on the magnetic sensor, without the addition of new components.

Solution to Problem

The electric drive device according to the present invention is an electric drive device, including: a first armature coil having three phases in which current phases are mutually separated by $2\pi/3$; a first inverter for applying voltage to the first armature coil; a first connecting member having three connecting wires which connect the first armature coil and the first inverter; a second armature coil having three phases in which the current phases are delayed by a phase delay of $\Delta\theta$ in a range of $\pi/6-\pi/12 \leq \Delta\theta \leq \pi/6+\pi/12$, relative to the first armature coil; a second inverter for applying voltage to the second armature coil; a second connecting member having three connecting wires which connect the second armature coil and the second inverter; and a magnetic sensor arranged between the first connecting member and the second connecting member and detecting an angle of rotation of a rotor on the basis of change in a magnetic field generated by rotation of the rotor, wherein following three sets of connecting wires, which are sets of connecting wires of the first connecting member and connecting wires of the second connecting member, are arranged in linear symmetry with respect to each other, with an x axis, which is an axis of detection of the magnetic sensor, being an axis of symmetry: "a first set of connecting wires: a set comprising one connecting wire B of the first connecting member, and a connecting wire of the second connecting member which has a current phase that is delayed by the phase delay of $\Delta\theta$ relative to the connecting wire B; a second set of connecting wires: a set comprising a connecting wire A of the first connecting member which has a current phase that is advanced by $2\pi/3$ relative to the connecting wire B, and a connecting wire of the second connecting member which has a current phase differential greater than the phase delay $\Delta\theta$ relative to the connecting wire A; a third set of connecting wires: a set comprising a connecting wire C of the first connecting member which has a current phase that is delayed by $2\pi/3$ relative to the connecting wire B, and a connecting wire of the second connecting member which has a current phase differential greater than the phase delay $\Delta\theta$ relative to the connecting wire C", and wherein when another axis of detection of the magnetic sensor, which is orthogonal to the x axis, is defined as a y axis, and angles formed between the y axis and straight lines which link the magnetic sensor with the connecting wire A, the connecting wire B and the connecting wire C are respectively defined as $\theta a$, $\theta b$ and $\theta c$, then $Fsum=\sin(2\theta a+\pi/4)-\sin(2\theta b-\pi/12)+\sin(2\theta c-5\pi/12)$ and $Fdiff=\sin(2\theta a-\pi/4)-\sin(2\theta b+\pi/12)+\sin(2\theta c+5\pi/12)$ satisfy relationships $Fsum<K$ and $Fdiff<K$ with respect to a required value K which is determined on the basis of a tolerance value for torque ripples included in output torque.

Furthermore, a further electric drive device according to the present invention is an electric drive device, including: a first armature coil having three phases in which current phases are mutually separated by $2\pi/3$; a first inverter for applying voltage to the first armature coil; a first connecting member having three connecting wires which connect the first armature coil and the first inverter; a second armature coil having three phases in which current phases are delayed by a phase delay of Δθ in a range of π/6−π/12≤Δθ≤π/6+π/12, relative to the first armature coil; a second inverter for applying voltage to the second armature coil; a second connecting member having three connecting wires which connect the second armature coil and the second inverter; and a magnetic sensor arranged between the first connecting member and the second connecting member and detecting an angle of rotation of a rotor on the basis of change in a magnetic field generated by rotation of the rotor, wherein following three sets of connecting wires, which are sets of connecting wires of the first connecting member and connecting wires of the second connecting member, are arranged in point symmetry centered on the magnetic sensor: "a first set of connecting wires: a set comprising one connecting wire B of the first connecting member, and a connecting wire of the second connecting member which has a current phase that is delayed by the phase delay of Δθ relative to the connecting wire B; a second set of connecting wires: a set comprising a connecting wire A of the first connecting member which has a current phase that is advanced by 2π/3 relative to the connecting wire B, and a connecting wire of the second connecting member which has a current phase differential greater than the phase delay Δθ relative to the connecting wire A; a third set of connecting wires: a set comprising a connecting wire C of the first connecting member which has a current phase that is delayed by 2π/3 relative to the connecting wire B, and a connecting wire of the second connecting member which has a current phase differential greater than the phase delay Δθ relative to the connecting wire C", and wherein when another axis of detection of the magnetic sensor, which is orthogonal to the x axis, is defined as a y axis, and angles formed between the y axis and straight lines which link the magnetic sensor with the connecting wire A, the connecting wire B and the connecting wire C are respectively defined as θa, θb and θc, then Fsum=sin(2θa+π/4)+√2 sin(π/12)sin(2θb+π/4)−√2 cos(π/12) sin(2θc+π/4) and Fdiff=sin(2θa−π/4)+√2 sin(π/12)sin(2θb−π/4)−√2 cos(π/12)sin(2θc−π/4) satisfy relationships Fsum<K and Fdiff<K with respect to a required value K which is determined on the basis of a tolerance value for torque ripples included in output torque.

Advantageous Effects of Invention

In the present invention, connecting members which connect a motor and inverters are arranged optimally in such a manner that the magnetic fields produced by three-phase alternating current flowing in the connecting members cancel each other out and are reduced at the position of a magnetic sensor. As a result of this, it is possible to obtain an electric drive device which is capable of detecting the angular position of the rotor of the motor, with high accuracy, without adding a new component.

DESCRIPTION OF EMBODIMENTS

Figure 1:
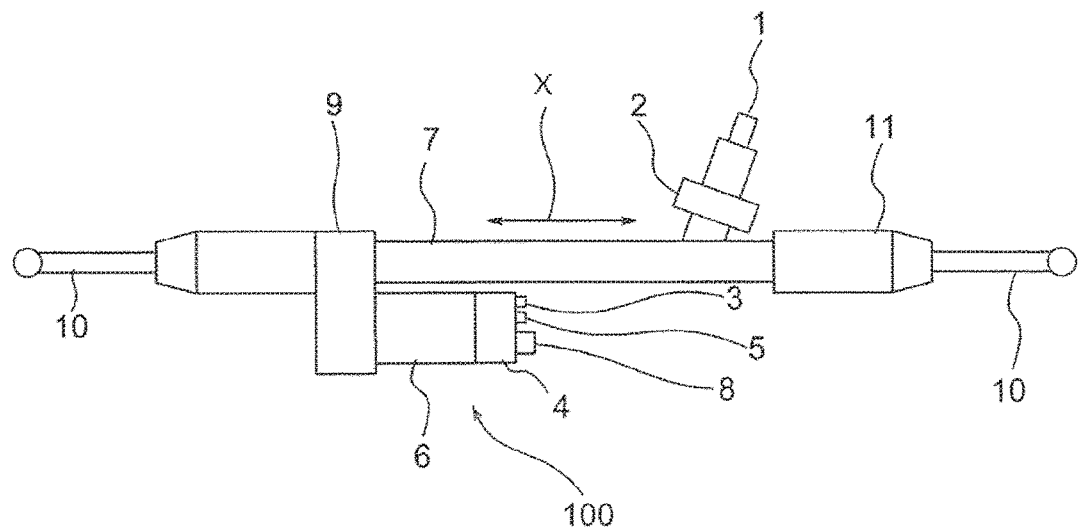
FIG. 1 is a schematic drawing illustrating an electric power steering device provided with an electric drive device according to a first embodiment of the present invention.

Below, a preferred embodiment of an electric drive device according to this invention is described with reference to the drawings. Parts which are the same or equivalent in the drawings are labelled with the same reference numerals.

First Embodiment

FIG. 1 is a schematic drawing illustrating an electric power steering device provided with an electric drive device 100 according to a first embodiment of the present invention. The electric drive device 100 illustrated in FIG. 1 is configured by integrating a motor 6 and an ECU 4. The motor 6 according to the first embodiment envisages a permanent magnet-type of motor.

The ECU 4 is provided with an inverter circuit for driving the motor 6 and a control substrate. When the driver of a vehicle turns a steering wheel (not illustrated), the torque thereof is transmitted to a shaft 1 via a steering shaft (not illustrated). In this case, the torque value detected by the torque sensor 2 is converted into an electrical signal, passed along a cable (not illustrated) and sent to the ECU 4 via a first connector 3.

On the other hand, vehicle information, such as the vehicle speed, is converted into an electrical signal and transmitted to the ECU 4 via a second connector 5. The ECU 4 calculates a required assist torque from the vehicle information, such as the vehicle speed and steering torque, and supplies a current to the motor 6 via an inverter circuit. The power supplied to the ECU 4 is supplied from the battery and/or alternator via a power supply connector 8.

The motor 6 is disposed in parallel with the direction of movement (indicated by arrow X) of a rack shaft (not illustrated) which is situated inside a housing 7. The torque generated by the motor 6 is decelerated by a gear box 9 which incorporates a belt (not illustrated) and a ball screw (not illustrated), and generates an impelling force that moves the rack shaft in the direction of arrow X. Consequently, a tie rod 10 moves, the tires turn and the vehicle can be steered. In this way, by assisting the steering force of the driver with the torque of the motor 6, the driver is able to steer the vehicle while using little steering force. A rack boot 11 serves to prevent foreign matter from penetrating inside the electric power steering device.

Figure 2:
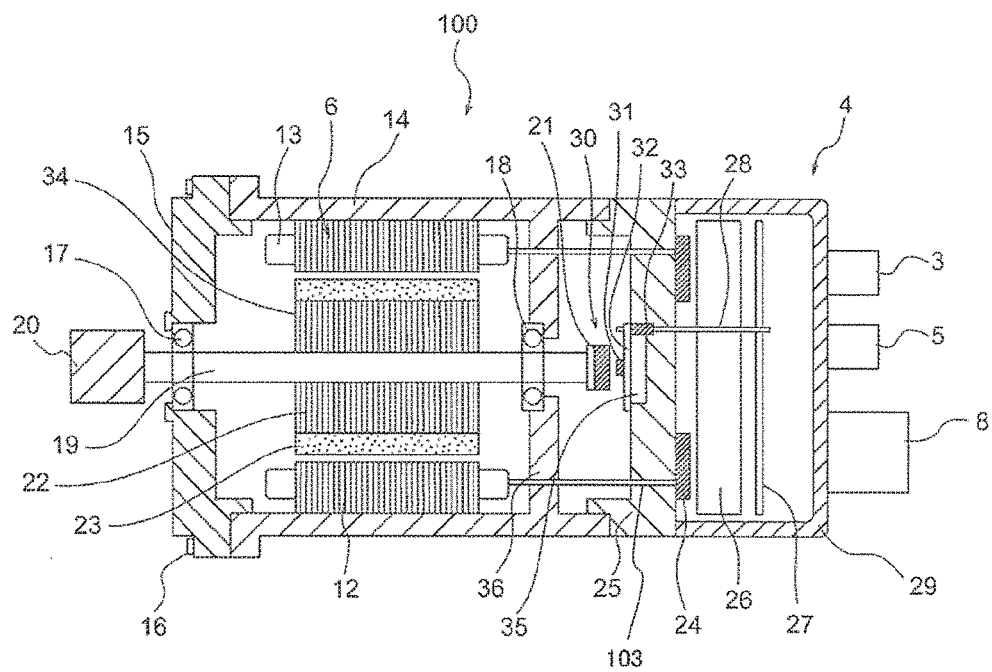
FIG. 2 is a lateral cross-sectional drawing of the electric drive device according to the first embodiment of the present invention.

FIG. 2 is a lateral cross-sectional drawing of the electric drive device 100 according to the first embodiment of the present invention. Below, the constituent elements and functions of the electric drive device 100 according to the first embodiment will be described in more detail with reference to FIG. 2.

The motor 6 is constituted by a stator core 12 configured by layering electromagnetic plates, an armature coil 13 which is wound about the stator core 12, and a frame 14 which fixes the stator core 12. Here, the frame 14 is fixed by bolts 16 to a housing 15 on the opposite side of the ECU 4.

A first axial bearing 17 is provided in the housing 15, and the first axial bearing 17, together with a second axial bearing 18, rotatably supports a shaft 19. The second axial bearing 18 is supported by a wall section 36 which is provided either in an integrated fashion with the frame 14 or as a separate body.

A pulley 20 is pressure-fitted onto an output shaft-side end portion of the shaft 19, and the pulley 20 performs a movement for transmitting drive force to the belt of the electric power steering device. A sensor permanent magnet 21 is provided on the other end portion of the shaft 19. The shaft 19 is pressure-fitted onto a rotor core 22, and permanent magnets 23 are fixed to the rotor core 22.

The ECU 4 comprises a first connector 3 which receives a signal from the torque sensor 2, a second connector 5 which receives vehicle information, such as a vehicle speed, and a power supply connector 8 which receives a supply of power. Furthermore, the ECU 4 is provided with an inverter circuit for driving the motor 6, and the inverter circuit is configured by using a switching element 24, such as a MOSFET. This switching element 24 can be achieved by, for instance, a configuration in which a bare chip is mounted in a DBC (Direct Bonded Copper) substrate, or a configuration in which a bare chip is molded with resin to create a module.

Here, the switching element 24 generates heat due to the flow of current for driving the motor 6. Therefore, the switching element 24 has a structure for dissipating heat by making contact with a heat sink 25, via adhesive and an insulating sheet, etc.

The inverter circuit includes, apart from the switching element 24, a smoothing capacitor and noise removing coil, a power source relay and a bus bar which electrically connects these elements, and the like, but these elements are not depicted in FIG. 2. The inverter circuit is electrically connected to the armature coil 13 via a connecting member 103 constituted by a terminal which is a part of, or a separate member from, the armature coil 13, and/or a bus bar. The connecting member 103 is required to pass through the heat sink 25, and therefore a hole (not illustrated) passing through the connecting member 103 is provided in the heat sink 25.

The bus bar is molded in an integrated fashion with resin to form an intermediate member 26. Furthermore, a control substrate 27 is provided adjacently to the intermediate member 26. This control substrate 27 sends a control signal to the switching element 24 in order to drive the motor 6 appropriately, on the basis of the information received from the first connector 3 and the second connector 5. The control signal is transmitted to a connecting member 28 which electrically connects the control substrate 27 and the switching element 24. This connecting member 28 is fixed by wire bonding and/or press-fitting, solder, etc.

The inverter circuit and control substrate 27 are covered by a case 29. The case 29 may be made from resin, or may be made from a metal such as aluminum. Furthermore, the case may also combine resin and a metal such as aluminum. The control substrate 27 is arranged vertically with respect to the axial line direction of the shaft 19 of the motor 6.

There is a sensor unit 30 on the motor 6 side of the heat sink 25. The sensor unit 30 has a magnetic sensor 31, a substrate 32, the connecting member 28 and a supporting member 33, and the substrate 32 on which the magnetic sensor 31 has been mounted is fixed by screws (not illustrated) to the heat sink 25.

The rotor 34 is configured by providing the rotor core 22 and the sensor permanent magnet 21. The magnetic sensor 31 is arranged on the axis of rotation of the rotor 34, and is disposed so as to be separated by a gap from the sensor permanent magnet 21 which is provided on the opposite end of the rotor 34 from the output side end of the shaft 19. The magnetic sensor 31 detects the angle of rotation of the rotor 34 by detecting change in the magnetic field created by the sensor permanent magnet 21. The ECU 4 supplies a suitable drive current to the motor 6 in accordance with the detected angle of rotation.

The connecting member 28 is supported by the supporting member 33 and electrically connects the substrate 32 of the sensor unit 30 and the control substrate 27. This connection may be may be press-fitting or soldering. The connecting member 28 is required to pass through the heat sink 25 and the intermediate member 26, and therefore a hole (not illustrated) passing through the connecting member 28 is provided in the heat sink 25 and the intermediate member 26. Moreover, although not illustrated in the drawings, the intermediate member 26 has a configuration wherein a guide is provided so as to register the position of the connecting member 28.

FIG. 2 shows an example in which the magnetic sensor 31 is mounted on the substrate 32 that is different from the control substrate 27, but it is also possible to adopt a configuration wherein the magnetic sensor 31 is mounted on the control substrate 27, and the magnetic flux leaking from the sensor permanent magnet 21 via the heat sink 25 is detected. Furthermore, the positional relationship between the intermediate member 26 and the control substrate 27 has a configuration which involves the opposite arrangement to that in FIG. 2.

A recess section 35 is provided in the heat sink 25 and the distance between the magnetic sensor 31 mounted on the substrate 32 and the sensor unit 30, and the surface of the heat sink 25, is increased. Furthermore, the heat sink 25 is fixed to the frame 14 of the motor 6, by screws or shrink fitting, etc. By fixing the heat sink 25 to the frame 14 of the motor 6 in this way, the heat of the heat sink 25 can be transmitted to the frame 14 of the motor 6.

Figure 3:
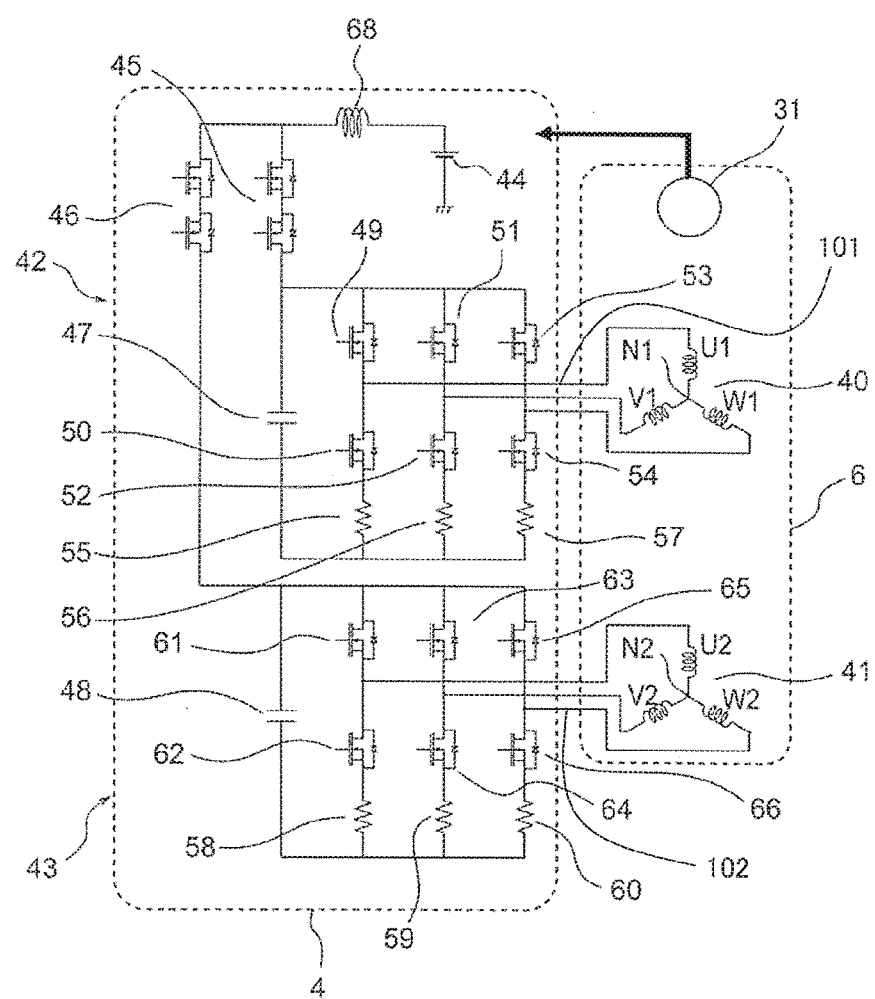
FIG. 3 is an electric circuit diagram of the electric drive device according to the first embodiment of the present invention.

FIG. 3 is an electrical circuit diagram of the electric drive device 100 according to the first embodiment of the present invention. The motor 6 has a first armature coil 40 to which three-phase alternating currents U1, V1, W1 are applied, and a second armature coil 41 to which three-phase alternating currents U2, V2, W2 are applied. In FIG. 3, a Y wiring connection is adopted, but it is also possible to adopt a Δ wiring connection. Furthermore, the motor 6 illustrated in FIG. 3 omits the configuration apart from the first armature coil 40 and the second armature coil 41.

A first inverter 42 supplies three-phase alternating current to the first armature coil 40. Similarly, a second inverter 43 supplies the three-phase alternating current to the second armature coil 41. DC power is supplied to the ECU 4 from a power source 44, such as a battery, and a first power source relay 45 and a second power source relay 46 are connected via a noise removing coil 68. The first power source relay 45 and the second power source relay 46 are configured respectively by two MOSFETs, and are opened in the event of a failure, or the like, so as to prevent the passage of excessive current.

In the ECU 4 illustrated in FIG. 3, only the first inverter 42 and the second inverter 43 are depicted, and the remainder of the configuration is omitted. Furthermore, in FIG. 3, the power source 44 is depicted as being situated inside the ECU 4, but in practice, power is supplied from an external power source 44, such as a battery, via the power supply connector 8.

Moreover, in FIG. 3, the coil 68, and the first power source relay 45 and the second power source relay 46 are connected in this order, but needless to say, the first power source relay 45 and the second power source relay 46 may be provided in a position nearer to the power source 44 than the coil 68.

Furthermore, the first capacitor 47 and the second capacitor 48 are smoothing capacitors. In FIG. 3, the capacitors are constituted by one capacitor each, by needless to say, the capacitors may also be constituted by connecting a plurality of capacitors in parallel.

As illustrated in FIG. 3, the first inverter 42 is constituted by a bridge using six MOSFETs. In the first inverter 42, a MOSFET 49 and a MOSFET 50 are connected in series, a MOSFET 51 and a MOSFET 52 are connected in series, and a MOSFET 53 and a MOSFET 54 are connected in series. Furthermore, these three sets of MOSFETs are connected in parallel.

The GND (ground) sides of the MOSFET 50, the MOSFET 52 and the MOSFET 54 in FIG. 3 are respectively connected, one by one, to a first shunt 55, a second shunt 56 and a third shunt 57. These shunt resistances are used for detection of the current value. FIG. 3 depicts an example in which there are three shunts, but there may also be two shunts, and current detection is also possible with one shunt, and therefore needless to say, a configuration of this kind may also be adopted.

As illustrated in FIG. 3, current to the motor 6 is supplied to the U1 phase of the motor 6 from between the MOSFET 49 and the MOSFET 50, via a first connecting member 101 and a bus bar, etc. Furthermore, in a similar fashion, current is supplied respectively to the V1 phase of the motor 6 from between the MOSFET 51 and the MOSFET 52, and to the W1 phase of the motor 6 from between the MOSFET 53 and the MOSFET 54.

Meanwhile, the second inverter 43 also has a similar configuration and in the second inverter 43, a MOSFET 61 and a MOSFET 62 are connected in series, a MOSFET 63 and a MOSFET 64 are connected in series, and a MOSFET 65 and a MOSFET 66 are connected in series. Furthermore, these three sets of MOSFETs are connected in parallel.

The GND (ground) sides of the MOSFET 62, the MOSFET 64 and the MOSFET 66 in FIG. 3 are respectively connected, one by one, to a first shunt 58, a second shunt 59 and a third shunt 60. These shunt resistances are used for detection of the current value. FIG. 3 depicts an example in which there are three shunts, but there may also be two shunts, and current detection is also possible with one shunt, and therefore needless to say, a configuration of this kind may also be adopted.

As illustrated in FIG. 3, current to the motor 6 is supplied to the U2 phase of the motor 6 from between the MOSFET 61 and the MOSFET 62, via a second connecting member 102 and the bus bar, etc. Furthermore, in a similar fashion, current is supplied respectively to the V2 phase of the motor 6 from between the MOSFET 63 and the MOSFET 64, and to the W2 phase of the motor 6 from between the MOSFET 65 and the MOSFET 66.

FIG. 3 does not show a motor relay which, in the event of a failure, electrically disconnects the motor 6 and the first inverter 42 and the second inverter 43, but a motor relay may be provided at neutral points N1, N2 or between the motor 6 and the inverter.

The first inverter 42 is controlled by the control circuit (not illustrated) and supplies a desired three-phase alternating current to the first armature coil 40. Similarly, the second inverter 43 supplies a three-phase alternating current to the second armature coil 41. Here, the control circuit controls the first armature coil 40 and the second armature coil 41 by switching the MOSFETs 49 to 54 and 61 to 66, in accordance with the angle of rotation detected by the magnetic sensor 31 which is provided in the motor 6. A GMR sensor or AMR sensor, etc. is used for the magnetic sensor 31.

Figure 4:
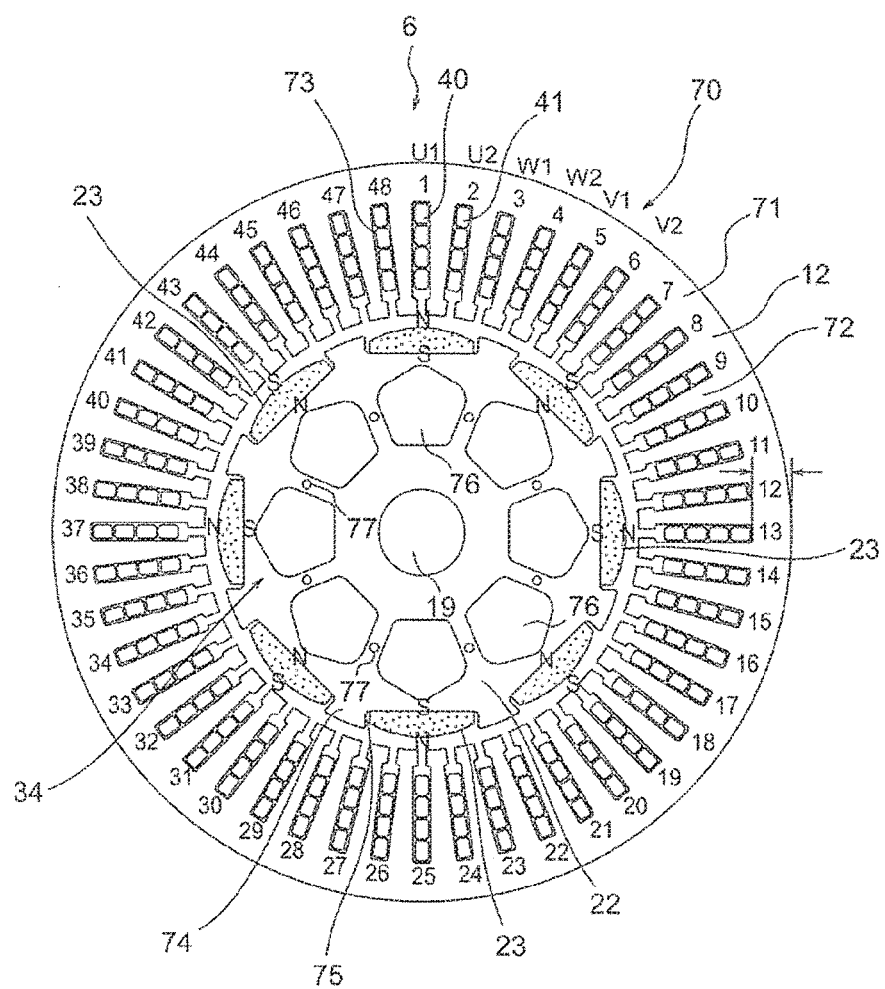
FIG. 4 is a front cross-sectional diagram of a motor of the electric drive device according to the first embodiment of the present invention.

FIG. 4 is front cross-sectional drawing of the motor 6 of the electric drive device 100 according to the first embodiment of the present invention. The motor 6 illustrated in FIG. 4 is constituted by a stator 70 and the rotor 34 which surrounds the stator 70. Furthermore, the stator 70 is constituted by the first armature coil 40, the second armature coil 41 and the stator core 12.

The stator core 12 is constituted by a ring-shaped core back 71 constituted by a magnetic body, such as an electromagnetic steel plate, and teeth 72 which extend in an inward radial direction from the core back 71. The first armature coil 40 and the second armature coil 41 are accommodated in slots 73 formed between the adjacent teeth 72. Although not illustrated in the drawings, electrical insulation is ensured by inserting insulating paper, or the like, between the first armature coil 40 and the second armature coil 41, and the stator core 12.

A total number of 48 of the teeth 72 illustrated in FIG. 4 are formed, and consequently, there are 48 slots 73. Four coils each of the first armature coil 40 and the second armature coil 41 are accommodated in each slot 73. Three-phase alternating currents in the U1 phase, the V1 phase and the W1 phase are applied to the first armature coil 40, and three-phase alternating currents in the U2 phase, the V2 phase and the W2 phase are applied to the second armature coil 41.

As illustrated in FIG. 4, the arrangement of the first armature coil 40 and the second armature coil 41 is U1, U2, W1, W2, V1, V2, in order from the first slot 73, and then U1, U2, W1, W2, V1, V2, in order from the seventh slot onwards and so on in a similar order until the 48th slot.

The first armature coil 40 and the second armature coil 41 are arranged in such a manner that the directions of the current U1 in the first slot 73 and U1 in the seventh slot 73 are mutually opposite. In other words, a distributed coil configuration is adopted which is wound about the first slot 73 to the seventh slot 73, and the first armature coil 40 and the second armature coil 41 span a total of six teeth.

This corresponds to an electrical angle of 180 degrees and a short-pitch winding coefficient of 1, and therefore the magnetic flux generated by the permanent magnets 23 can be utilized efficiently. As a result of this, a compact high-torque motor 6 is obtained, the amount of permanent magnets 23 can be reduced, and reduced costs can be achieved in comparison with a motor having a small winding coefficient.

The rotor 34 which has the permanent magnets 23 provided on the surface of the rotor core 22 is provided on the inside of the stator 70. Eight of the permanent magnets 23 are arranged in the circumferential direction, thus creating an eight-pole configuration. Adjacent permanent magnets 23 have mutually opposite polarities. Furthermore, projections 74 are provided on the rotor core 22.

Gaps 75 for reducing the leaking magnetic flux are formed between the projections 74 and the permanent magnets 23. These projections 74 have the effect of reducing the gap length of the motor 6, thus increasing the inductance. Therefore, the effects of weak magnetic flux control can readily be achieved, and the torque in the event of high-speed rotation can be improved. Since it is effective to make the gap length between the inner diameter of the stator core and the projections as small as possible, and to make the projections larger, then the gap length between the inner diameter of the stator and both ends of the permanent magnets is larger than the gap length between the inner diameter of the stator and the projections.

In other words, in a normal surface magnet-type motor, the relationship between the height of the projections for positioning the magnets and the height of the permanent magnets is an inverse relationship, and providing the projections along the axial direction is particularly effective in raising the surface area of the projections. In other words, a configuration is adopted in which the side surfaces of the permanent magnets are surrounded by the projections, with the exception of the outer radial portions of the permanent magnets, and the permanent magnets are embedded in the rotor core.

Hole sections 76 are formed in the rotor core 22, at even intervals apart along the circumferential direction. By providing the hole sections 76, the weight and inertia can be reduced. Furthermore, the rotor core 22 is configured by laminating electromagnetic steel plates, etc. and the electromagnetic steel plates are coupled to each other by calked sections 77. The shaft 19 is passed through the center of the rotor core 22.

Normally, in order to prevent scattering of the permanent magnets 23 due to fracturing or breaking of the permanent magnets 23, a metal circular tube made from a thin plate of stainless steel, or the like, is placed over the outer surface of the rotor 34.

Figure 5:
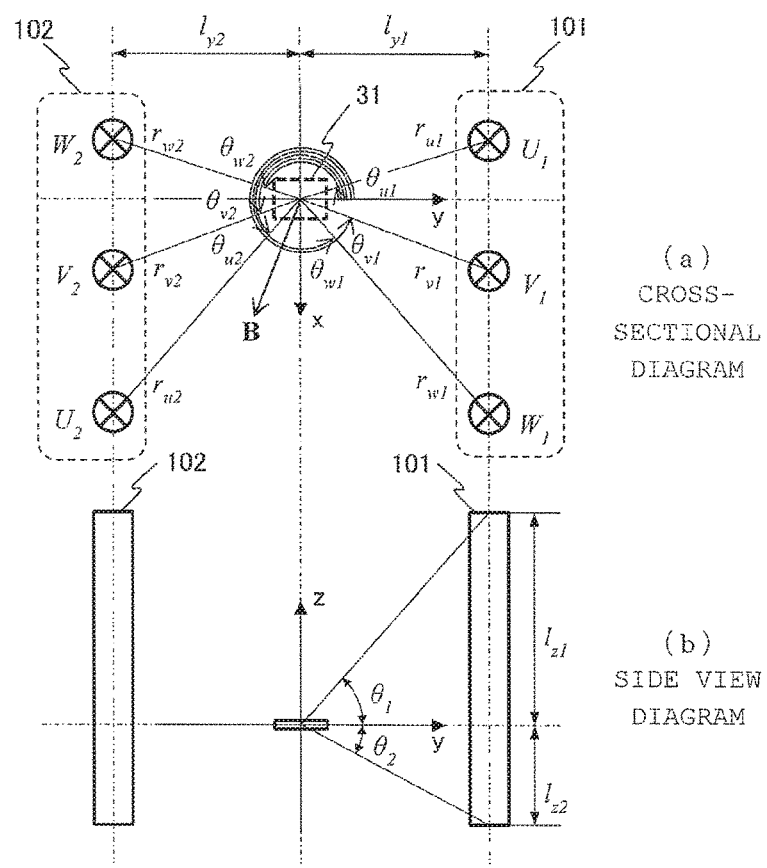
FIG. 5 is a schematic drawing illustrating the positional relationship between a magnetic sensor, a first connecting member and a second connecting member in the electric drive device according to the first embodiment of the present invention.

FIG. 5 is a schematic drawing illustrating the positional relationship between the magnetic sensor 31, the first connecting member 101 and the second connecting member 102 in the electric drive device 100 according to the first embodiment of the present invention.

Three-phase alternating currents are applied to the first armature coil 40 of the motor 6, via the first connecting member 101 which has three connection wires. Furthermore, three-phase alternating currents are applied to the second armature coil 41, via the second connecting member 102 which has three connection wires. The cross-section drawing in FIG. 5(a) and the side surface drawing in FIG. 5(b) respectively show a total of six connecting wires and the relative distance r and the angle θ with respect to the magnetic sensor 31. The subscript suffixes after r and θ indicate the respective phases of the three-phase alternating currents.

The magnetic field B illustrated in FIG. 5 is generated at the position of the magnetic sensor 31, by the current flowing in the first connecting member 101 and the second connecting member 102. In the description indicated below, the x component and the y component of the magnetic field B are respectively indicated by B_x and B_y. Here, the x axis, the y axis and the z axis are the directions indicated by the cross-sectional drawing in FIG. 5(a) and the side surface drawing in FIG. 5(b). In other words, the x axis and the y axis indicate mutually orthogonal detection axes of the magnetic sensor 31.

More specifically, as illustrated in FIG. 5, the z axis is a directional axis along the axis of rotation of the rotor 34, and is orthogonal to the x axis and the y axis. The first connecting member 101 and the second connecting member 102 are arranged in linear symmetry, with the x axis passing through the magnetic sensor 31 being an axis of symmetry, in a vertical cross-section at the position of the magnetic sensor 31 on the z axis.

As illustrated in FIG. 5(a), the y component of the distance r between the first connecting member 101 and the second connecting member 102, and the magnetic sensor 31, is ly1 and ly2, respectively. Furthermore, as illustrated in FIG. 5(b), of the length of the first connecting member 101, the length on the positive z-axis direction side with respect to the position of the magnetic sensor 31 is lz1 and the length on the negative z-axis direction side is lz2. Moreover, the angle formed between the magnetic sensor 31 and the end of the first connecting member 101 on the positive z-axis direction side is θ1, and the angle formed between the magnetic sensor 31 and the end of the first connecting member 101 on the negative z-axis direction side is θ2.

Furthermore, the currents flowing in the U1 phase, the V1 phase and the W1 phase of the first connecting member 101 are respectively called iu1, iv1 and iw1. Similarly, the currents flowing in the U2 phase, the V2 phase and the W2 phase of the second connecting member 102 are respectively called iu2, iv2 and iw2. Therefore, the magnetic field B generated at the position of the magnetic sensor 31 by these currents flowing in the first connecting member 101 and the second connecting member 102 is expressed by Formula (1) below. Here, μ0 is the magnetic permeability of a vacuum.

[Math. 1]

$$\begin{cases} B_{iu1\_x} = -\frac{\mu_0 i_{u1}}{4\pi r_{u1}}(\sin\theta_1 + \sin\theta_2)\cos\theta_{u1} & B_{iu1\_y} = -\frac{\mu_0 i_{u1}}{4\pi r_{u1}}(\sin\theta_1 + \sin\theta_2)\sin\theta_{u1} \\ B_{iv1\_x} = -\frac{\mu_0 i_{v1}}{4\pi r_{v1}}(\sin\theta_1 + \sin\theta_2)\cos\theta_{v1} & B_{iv1\_y} = -\frac{\mu_0 i_{v1}}{4\pi r_{v1}}(\sin\theta_1 + \sin\theta_2)\sin\theta_{v1} \\ B_{iw1\_x} = -\frac{\mu_0 i_{w1}}{4\pi r_{w1}}(\sin\theta_1 + \sin\theta_2)\cos\theta_{w1} & B_{iw1\_y} = -\frac{\mu_0 i_{w1}}{4\pi r_{w1}}(\sin\theta_1 + \sin\theta_2)\sin\theta_{w1} \\ B_{iu2\_x} = -\frac{\mu_0 i_{u2}}{4\pi r_{u2}}(\sin\theta_1 + \sin\theta_2)\cos\theta_{u2} & B_{iu2\_y} = -\frac{\mu_0 i_{u2}}{4\pi r_{u2}}(\sin\theta_1 + \sin\theta_2)\sin\theta_{u2} \\ B_{iv2\_x} = -\frac{\mu_0 i_{v2}}{4\pi r_{v2}}(\sin\theta_1 + \sin\theta_2)\cos\theta_{v2} & B_{iv2\_y} = -\frac{\mu_0 i_{v2}}{4\pi r_{v2}}(\sin\theta_1 + \sin\theta_2)\sin\theta_{v2} \\ B_{iw2\_x} = -\frac{\mu_0 i_{w2}}{4\pi r_{w2}}(\sin\theta_1 + \sin\theta_2)\cos\theta_{w2} & B_{iw2\_y} = -\frac{\mu_0 i_{w2}}{4\pi r_{w2}}(\sin\theta_1 + \sin\theta_2)\sin\theta_{w2} \end{cases} \quad (1)$$

Figure 6:
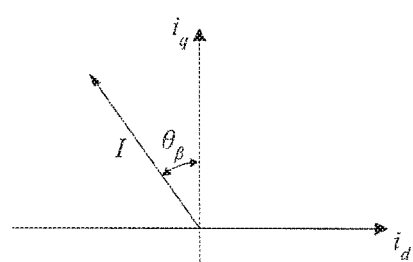
FIG. 6 is an illustrative drawing depicting a three-phase alternating current vectors on a rotary coordinates system.

FIG. 6 is an illustrative drawing depicting a three-phase alternating current vector on a rotary coordinates system. When the absolute value of the three-phase alternating current vector is defined as I, and the phase angle thereof from the q axis is defined as $\theta_\beta$, then the d-axis current id and the q-axis current iq are expressed by Formula (2) below.

[Math. 2]

$$\begin{cases} i_d = -I \sin\theta_\beta \\ i_q = I \cos\theta_\beta \end{cases} \quad (2)$$

The current phase of the three-phase alternating current flowing in the second armature coil 41 has a phase delay of $\Delta\theta$ relative to the current phase of the three-phase alternating current flowing in the first armature coil 40. In the description given below, it is assumed that the phase delay $\Delta\theta=\pi/6$, but the phase delay $\Delta\theta$ is not necessarily $\pi/6$ and may be in the range of $\pi/6\pm\pi/12$.

In this case, if the electrical angle is defined as $\theta$, then the current flowing in each phase of the three connecting wires of the first connecting member 101 and the three connecting wires of the second connecting member 102 is expressed by Formula (3) below.

[Math. 3]

$$\begin{cases} i_{u1} = \sqrt{2}\, I_{rms}\, \sin(\theta + \theta_\beta - \pi) \\ i_{v1} = \sqrt{2}\, I_{rms}\, \sin\left(\theta + \theta_\beta + \frac{\pi}{3}\right) \\ i_{w1} = \sqrt{2}\, I_{rms}\, \sin\left(\theta + \theta_\beta - \frac{\pi}{3}\right) \\ i_{u2} = \sqrt{2}\, I_{rms}\, \sin\left(\theta + \theta_\beta + \frac{5}{6}\pi\right) \\ i_{v2} = \sqrt{2}\, I_{rms}\, \sin\left(\theta + \theta_\beta + \frac{\pi}{6}\right) \\ i_{w2} = \sqrt{2}\, I_{rms}\, \sin\left(\theta + \theta_\beta - \frac{\pi}{2}\right) \end{cases} \quad (3)$$

Furthermore, if the relative distance r between the first connecting member 101 and the second connecting member 102, and the magnetic sensor 31, is solved in the y-axis direction, then the expression in Formula (4) below is obtained.

[Math. 4]

$$\begin{cases} r_{u1} = \dfrac{l_{y1}}{|\cos\theta_{u1}|}\ r_{v1} = \dfrac{l_{y1}}{|\cos\theta_{v1}|}\ r_{w1} = \dfrac{l_{y1}}{|\cos\theta_{w1}|} \\ r_{u2} = \dfrac{l_{y2}}{|\cos\theta_{u2}|}\ r_{v2} = \dfrac{l_{y2}}{|\cos\theta_{v2}|}\ r_{w2} = \dfrac{l_{y2}}{|\cos\theta_{w2}|} \end{cases} \quad (4)$$

In this respect, as illustrated in FIG. 5, if the three connecting lines of the first connecting member 101 and the three connecting lines of the second connecting member 102 are arranged in linear symmetry with respect to each other, with the x axis, which is the detection axis of the magnetic sensor 31, being the axis of symmetry, Formula (5) below is established.

[Math. 5]

$$l_{y2}=l_{y1} \quad (5)$$

Furthermore, considering that the three connecting wires of the first connecting member 101 are situated on the right-hand side of the magnetic sensor 31 (the positive region on the y axis), and the three connecting wires of the second connecting member 102 are situated on the left-hand side of the magnetic sensor 31 (the negative region on the y axis), then Formula (6) below is obtained.

[Math. 6]

$$\begin{cases} r_{u1} = \dfrac{l_{y1}}{\cos\theta_{u1}}\ r_{v1} = \dfrac{l_{y1}}{\cos\theta_{v1}}\ r_{w1} = \dfrac{l_{y1}}{\cos\theta_{w1}} \\ r_{u2} = -\dfrac{l_{y2}}{\cos\theta_{u2}}\ r_{v2} = -\dfrac{l_{y2}}{\cos\theta_{v2}}\ r_{w2} = -\dfrac{l_{y2}}{\cos\theta_{w2}} \end{cases} \quad (6)$$

Here, as illustrated in FIG. 5, one connecting wire B (V1 phase) from among the three connecting wires of the first connecting member 101, and the connecting wire (V2 phase) which is delayed by a phase delay of $\Delta\theta$ ($=\pi/6$) relative to the connecting wire B, from among the three connecting wires of the second connecting member 102, are arranged in linear symmetry with respect to each other, with the x axis being the axis of symmetry.

Furthermore, of the three sets of connecting wires of the first connecting member 101 and the second connecting member 102 which are arranged in linear symmetry, the two sets apart from the set including the connecting wire B described above are arranged in such a manner that the current phase differential therebetween is greater than the phase delay $\Delta\theta$.

In other words, the connecting wire A (U1 phase) of which the current phase is advanced by $2\pi/3$ relative to the connecting wire B, from among the three connecting wires of the first connecting member 101, and the connecting wire (W2 phase) which has a current phase differential greater than the phase delay $\Delta\theta$ relative to the connecting wire A, from among the three connecting wires of the second connecting member 102, are arranged in linear symmetry with respect to each other, with the x axis being the axis of symmetry.

In other words, the connecting wire C (W1 phase) of which the current phase is delayed by $2\pi/3$ relative to the connecting wire B, from among the three connecting wires of the first connecting member 101, and the connecting wire (U2 phase) which has a current phase differential greater than the phase delay $\Delta\theta$ relative to the connecting wire C, from among the three connecting wires of the second connecting member 102, are arranged in linear symmetry with respect to each other, with the x axis being the axis of symmetry.

In this case, Formula (7) below is established.

[Math. 7]

$$\begin{cases} \theta_{u2} = \pi - \theta_{w1} \\ \theta_{v2} = \pi - \theta_{v1} \\ \theta_{w2} = \pi - \theta_{u1} \end{cases} \quad (7)$$

From Formulas (1), (3), (6) and (7), the x component Bi_x and the y component Bi_y of the magnetic field B created at the position of the magnetic sensor 31 by the currents flowing in the first connecting member 101 and the second connecting member 102 are expressed by Formula (8) below.

[Math. 8]

$$\begin{cases} B_{i\_x} = \dfrac{\mu_0 I_{rms}}{4\pi l_{y0}}(\sin\theta_1 + \sin\theta_2)\left(\cos 2\theta_{u1} + \dfrac{\sqrt{3}-1}{2}\cos 2\theta_{v1} - \dfrac{\sqrt{3}+1}{2}\cos 2\theta_{w1}\right)\sin\left(\theta + \theta_\beta - \dfrac{\pi}{4}\right) \\ B_{i\_y} = \dfrac{\mu_0 I_{rms}}{4\pi l_{y1}}(\sin\theta_1 + \sin\theta_2)\left(\sin 2\theta_{u1} - \dfrac{\sqrt{3}+1}{2}\sin 2\theta_{v1} + \dfrac{\sqrt{3}-1}{2}\sin 2\theta_{w1}\right)\sin\left(\theta + \theta_\beta + \dfrac{\pi}{4}\right) \end{cases} \quad (8)$$

Since the magnetic field created by the sensor permanent magnet 21 is distorted by the magnetic field B expressed by Formula (8) above, then an error occurs in the angle of rotation detected by the magnetic sensor 31. Therefore, the effects of the magnetic field B on the magnetic sensor 31 can be suppressed by modifying the arrangement of the first connecting member 101 and the second connecting member 102.

The sum and difference of the coefficient which varies with the arrangement of the first connecting member 101 and the second connecting member 102, in Formula (8) above, is given by Formula (9) below. Consequently, if the variable Fsum and Fdiff of Formula (9) can be reduced, it is possible to reduce the effects of the magnetic field B on the magnetic sensor 31.

[Math. 9]

$$\begin{cases} F_{sum} = \sin\left(2\theta_{u1} + \dfrac{\pi}{4}\right) - \sin\left(2\theta_{v1} - \dfrac{\pi}{12}\right) + \sin\left(2\theta_{w1} - \dfrac{6}{12}\pi\right) \\ F_{diff} = \sin\left(2\theta_{u1} - \dfrac{\pi}{4}\right) - \sin\left(2\theta_{v1} + \dfrac{\pi}{12}\right) + \sin\left(2\theta_{w1} + \dfrac{6}{12}\pi\right) \end{cases} \quad (9)$$

If the cross-sectional diagram in FIG. 5(a) is divided along the x axis and the y axis, then the plane in which the magnetic sensor 31 is situated can be divided into four quadrants, and the first connecting member 101 is situated in the two quadrants on the right-hand side of the magnetic sensor 31 (the positive region on the y axis), from among these four quadrants. In this case, the three connecting wires of the first connecting member 101 can be arranged in distributed fashion in these two quadrants, or the three connecting wires can all be arranged in the same quadrant.

Figure 7:
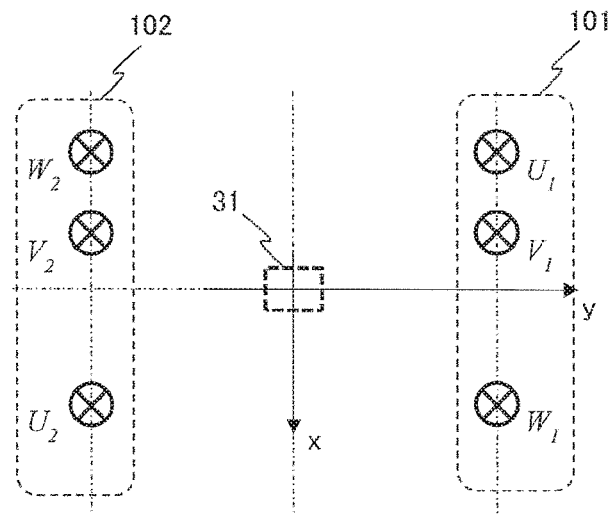
FIG. 7 is a diagram illustrating an example of the arrangement of the first connecting member and the second connecting member when the three connecting wires of the first connecting member are arranged in different quadrants, in the electric drive device according to the first embodiment of the present invention.

FIG. 7 is a diagram illustrating an example of the arrangement of the first connecting member 101 and the second connecting member 102 when the three connecting wires of the first connecting member 101 are arranged in different quadrants, in the electric drive device 100 according to the first embodiment of the present invention.

If the three connecting wires of the first connecting member 101 are arranged in two quadrants, then as illustrated in FIG. 7, the connecting wire A (U1 phase) having a current phase advanced by 2π/3 relative to the connecting wire B (V1 phase) and the connecting wire C (W1 phase) having a current phase delayed by 2π/3 relative to the connecting wire B (V1 phase) are arranged in different quadrants. Therefore, the connecting wire B is arranged between the connecting wire A and the connecting wire C in the proximity of the connecting wire A at a position further towards the side of the connecting wire A than the intermediate position between the connecting wire A and the connecting wire C.

As well as arranging the first connecting member 101 and the second connecting member 102 in this manner, the first connecting member 101 and the second connecting member 102 are also arranged so as to satisfy the relationships Fsum<K and Fdiff<K with respect to a predetermined required value K, which is determined from the tolerance value for the torque ripple included in the output torque of the motor 6. As a result of this, the magnetic fields produced by the three-phase alternating current flowing in the first connecting member 101 and the second connecting member 102 are cancelled out and reduced at the position of the magnetic sensor 31, and therefore it is possible to improve the detection accuracy of the magnetic sensor 31.

Figure 8:
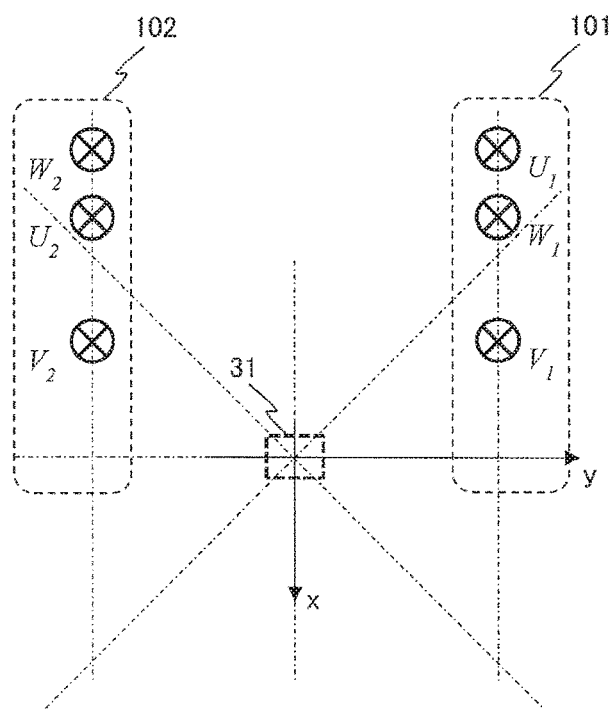
FIG. 8 is a diagram illustrating an example of the arrangement of the first connecting member and the second connecting member when the three connecting wires of the first connecting member are arranged in the same quadrant, in the electric drive device according to the first embodiment of the present invention.

FIG. 8 is a diagram illustrating an example of the arrangement of the first connecting member 101 and the second connecting member 102 when the three connecting wires of the first connecting member 101 are arranged in the same quadrant, in the electric drive device 100 according to the first embodiment of the present invention.

If the three connecting wires of the first connecting member 101 are arranged in the same quadrant, then as illustrated in FIG. 8, the connecting wire A (U1 phase) and the connecting wire B (V1 phase) are arranged in different quadrants, of the four quadrants which are divided by two straight lines at equal distances from the x axis and the y axis (in other words, the two straight lines of the y axis and π/4). Therefore, the connecting wire C (W1 phase) is arranged between the connecting wire A and the connecting wire B in the proximity of the connecting wire A at a position further towards the side of the connecting wire A than the intermediate position between the connecting wire A and the connecting wire B.

As well as arranging the first connecting member 101 and the second connecting member 102 in this manner, the first connecting member 101 and the second connecting member 102 are also arranged so as to satisfy the relationships Fsum<K and Fdiff<K with respect to a predetermined required value K, which is determined from the tolerance value for the torque ripple included in the output torque of the motor 6. As a result of this, the magnetic fields produced by the three-phase alternating current flowing in the first connecting member 101 and the second connecting member 102 are cancelled out and reduced at the position of the magnetic sensor 31, and therefore it is possible to improve the detection accuracy of the magnetic sensor 31.

The descriptions given above relate to an arrangement method in a case where the relationship in Formula (7) above is established, but even if Formula (10) or Formula (11) below is established, instead of Formula (7) above, by using the connecting wire of the W1 phase or the connecting wire of the U1 phase, instead of the connecting wire of the V1 phase, as the connecting wire B, it is possible to obtain an optimal arrangement method of the first connecting member 101 and the second connecting member 102, by a similar procedure.

[Math. 10]

$$\begin{cases} \theta_{u2} = \pi - \theta_{v1} \\ \theta_{v2} = \pi - \theta_{u1} \\ \theta_{w2} = \pi - \theta_{w1} \end{cases} \quad (10)$$

$$\begin{cases} \theta_{u2} = \pi - \theta_{u1} \\ \theta_{v2} = \pi - \theta_{w1} \\ \theta_{w2} = \pi - \theta_{v1} \end{cases} \quad (11)$$

As described above, in the first embodiment, connecting members which connect a motor and inverters are arranged in linear symmetry in such a manner that the magnetic fields produced by the three-phase alternating current flowing in the connecting members cancel each other out and are reduced at the position of a magnetic sensor. Furthermore, the connecting members are arranged in such a manner that Fsum and Fdiff in Formula (9) above satisfy the relationships Fsum<K and Fdiff<K, with respect to the predetermined required value K. As a result of this, it is possible to obtain an electric drive device which is capable of detecting the angular position of the rotor of the motor, with high accuracy, without adding a new component.

Second Embodiment

In the first embodiment described above, a method is described in which the first connecting member 101 and the second connecting member 102 are arranged in linear symmetry, with the x axis as the axis of symmetry, but in the second embodiment, a method is described in which the first connecting member 101 and the second connecting member 102 are arranged in point symmetry centered on the magnetic sensor 31.

The current phase of the three-phase alternating current flowing in the second armature coil 41 has a phase delay of Δθ relative to the current phase of the three-phase alternating current flowing in the first armature coil 40. In the description given below, it is assumed that the phase delay Δθ=π/6, but the phase delay Δθ is not necessarily π/6 and may be in the range of π/6±π/12.

In the second embodiment, as illustrated in FIG. 7, one connecting wire B (V1 phase) from among the three connecting wires of the first connecting member 101, and the connecting wire (V2 phase) which is delayed by a phase delay of Δθ (=π/6) relative to the connecting wire B, from among the three connecting wires of the second connecting member 102, are arranged in point symmetry with respect to each other, centered on the magnetic sensor 31.

Furthermore, of the three sets of connecting wires of the first connecting member 101 and the second connecting member 102 which are arranged in point symmetry centered on the magnetic sensor 31, the two sets apart from the set including the connecting wire B described above are arranged in such a manner that the current phase differential therebetween is greater than the phase delay Δθ.

In other words, the connecting wire A (U1 phase) of which the current phase is advanced by 2π/3 relative to the connecting wire B, from among the three connecting wires of the first connecting member 101, and the connecting wire (W2 phase) which has a current phase differential greater than the phase delay Δθ relative to the connecting wire A, from among the three connecting wires of the second connecting member 102, are arranged in point symmetry centered on the magnetic sensor 31.

Furthermore, the connecting wire C (W1 phase) of which the current phase is delayed by 2π/3 relative to the connecting wire B, from among the three connecting wires of the first connecting member 101, and the connecting wire (U2 phase) which has a current phase differential greater than the phase delay Δθ relative to the connecting wire C, from among the three connecting wires of the second connecting member 102, are arranged in point symmetry centered on the magnetic sensor 31.

In this case, Formula (12) below is established instead of Formula (7) above in the first embodiment.

[Math. 11]

$$\begin{cases} \theta_{u2} = \pi + \theta_{w1} \\ \theta_{v2} = \pi + \theta_{v1} \\ \theta_{w2} = \pi + \theta_{u1} \end{cases} \quad (12)$$

From Formulas (1), (3), (6) and (12), the x component $B_{i\_x}$ and the y component $B_{i\_y}$ of the magnetic field B created at the position of the magnetic sensor 31 by the currents flowing in the first connecting member 101 and the second connecting member 102 are expressed by Formula (13) below.

[Math. 12]

$$\begin{cases} B_{i\_x} = \frac{\mu_0 I_{rms}}{4\pi l_{y1}}(\sin\theta_1 + \sin\theta_2)\left(\cos2\theta_{u1} + \sqrt{2}\sin\frac{\pi}{12}\cos2\theta_{v1} - \sqrt{2}\cos\frac{\pi}{12}\cos2\theta_{w1}\right)\sin\left(\theta + \theta_\beta - \frac{\pi}{4}\right) \\ B_{i\_y} = \frac{\mu_0 I_{rms}}{4\pi l_{y1}}(\sin\theta_1 + \sin\theta_2)\left(\sin2\theta_{u1} + \sqrt{2}\sin\frac{\pi}{12}\sin2\theta_{v1} - \sqrt{2}\cos\frac{\pi}{12}\sin2\theta_{w1}\right)\sin\left(\theta + \theta_\beta - \frac{\pi}{4}\right) \end{cases} \quad (13)$$

Since the magnetic field created by the sensor permanent magnet 21 is distorted by the magnetic field B expressed by Formula (13) above, then an error occurs in the angle of rotation detected by the magnetic sensor 31. Therefore, the effects of the magnetic field B on the magnetic sensor 31 can be suppressed by modifying the arrangement of the first connecting member 101 and the second connecting member 102.

The sum and difference of the coefficient which varies with the arrangement of the first connecting member 101 and the second connecting member 102, in Formula (13) above, is given by Formula (14) below. Consequently, if the variable Fsum and Fdiff of Formula (14) can be reduced, it is possible to reduce the effects of the magnetic field B on the magnetic sensor 31.

[Math. 13]

$$\begin{cases} F_{sum} = \sin(2\theta_{u1} + \frac{\pi}{4}) + \sqrt{2}\sin\frac{\pi}{12}\sin(2\theta_{v1} + \frac{\pi}{4}) - \sqrt{2}\cos\frac{\pi}{12}\sin(2\theta_{w1} + \frac{\pi}{4}) \\ F_{diff} = \sin(2\theta_{u1} - \frac{\pi}{4}) + \sqrt{2}\sin\frac{\pi}{12}\sin(2\theta_{v1} - \frac{\pi}{4}) - \sqrt{2}\cos\frac{\pi}{12}\sin(2\theta_{w1} - \frac{\pi}{4}) \end{cases} \quad (14)$$

Figure 9:
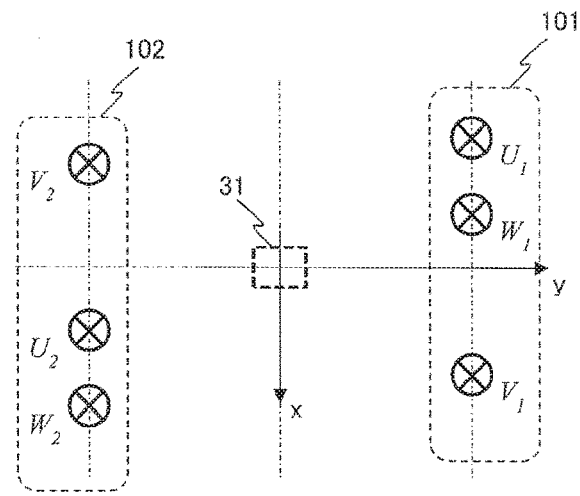
FIG. 9 is a diagram illustrating an example of the arrangement of the first connecting member and the second connecting member when the three connecting wires of the first connecting member are arranged in different quadrants, in an electric drive device according to a second embodiment of the present invention.

FIG. 9 is a diagram illustrating an example of the arrangement of the first connecting member 101 and the second connecting member 102 when the three connecting wires of the first connecting member 101 are arranged in different quadrants, in the electric drive device 100 according to the second embodiment of the present invention.

If the three connecting wires of the first connecting member 101 are arranged in separate fashion in two quadrants, then as illustrated in FIG. 9, the connecting wire B (V1 phase) and the connecting wire A (U1 phase) having a current phase advanced by 2π/3 relative to the connecting wire B are arranged in different quadrants. Therefore, the connecting wire C (W1 phase), which has a current phase delayed by 2π/3 relative to the connecting wire B, is arranged between the connecting wire A and the connecting wire B in the proximity of the connecting wire A at a position further towards the side of the connecting wire A than the intermediate position between the connecting wire A and the connecting wire B.

As well as arranging the first connecting member 101 and the second connecting member 102 in this manner, the first connecting member 101 and the second connecting member 102 are also arranged so as to satisfy the relationships Fsum<K and Fdiff<K with respect to a predetermined required value K, which is determined from the tolerance value for the torque ripple included in the output torque of the motor 6. As a result of this, the magnetic fields produced by the three-phase alternating current flowing in the first connecting member 101 and the second connecting member 102 are cancelled out and reduced at the position of the magnetic sensor 31, and therefore it is possible to improve the detection accuracy of the magnetic sensor 31.

Figure 10:
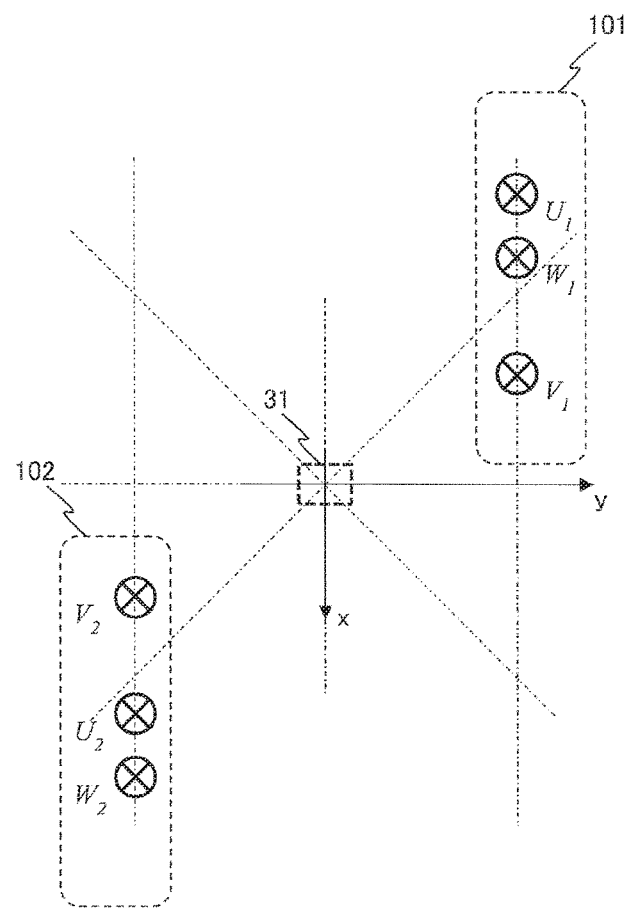
FIG. 10 is a diagram illustrating an example of the arrangement of the first connecting member and the second connecting member when the three connecting wires of the first connecting member are arranged in the same quadrant, in the electric drive device according to the second embodiment of the present invention.

FIG. 10 is a diagram illustrating an example of the arrangement of the first connecting member 101 and the second connecting member 102 when the three connecting wires of the first connecting member 101 are arranged in the same quadrant, in the electric drive device 100 according to the second embodiment of the present invention.

If the three connecting wires of the first connecting member 101 are arranged in the same quadrant, then as illustrated in FIG. 10, the connecting wire A (U1 phase) and the connecting wire B (V1 phase) are arranged in different quadrants, of the four quadrants which are divided by two straight lines at equal distances from the x axis and the y axis. Therefore, the connecting wire C (W1 phase) is arranged between the connecting wire A and the connecting wire B in the proximity of the connecting wire A at a position further towards the side of the connecting wire A than the intermediate position between the connecting wire A and the connecting wire B.

As well as arranging the first connecting member 101 and the second connecting member 102 in this manner, the first connecting member 101 and the second connecting member 102 are also arranged so as to satisfy the relationships Fsum<K and Fdiff<K with respect to a predetermined required value K, which is determined from the tolerance value for the torque ripple included in the output torque of the motor 6. As a result of this, the magnetic fields produced by the three-phase alternating current flowing in the first connecting member 101 and the second connecting member 102 are cancelled out and reduced at the position of the magnetic sensor 31, and therefore it is possible to improve the detection accuracy of the magnetic sensor 31.

The descriptions given above relate to an arrangement method in a case where the relationship in Formula (11) above is established, but even if Formula (15) or Formula (16) below is established, instead of Formula (11) above, by using the connecting wire of the W1 phase or the connecting wire of the U1 phase, instead of the connecting wire of the V1 phase, as the connecting wire B, it is possible to obtain an optimal arrangement method of the first connecting member 101 and the second connecting member 102, by a similar procedure.

[Math. 14]

$$\begin{cases} \theta_{u2} = \pi + \theta_{v1} \\ \theta_{v2} = \pi + \theta_{u1} \\ \theta_{w2} = \pi + \theta_{w1} \end{cases} \quad (15)$$

$$\begin{cases} \theta_{u2} = \pi + \theta_{u1} \\ \theta_{v2} = \pi + \theta_{w1} \\ \theta_{w2} = \pi + \theta_{v1} \end{cases} \quad (16)$$

As described above, in the second embodiment, connecting members which connect a motor and inverters are arranged in point symmetry in such a manner that the magnetic fields produced by three-phase alternating current flowing in the connecting members cancel each other out and are reduced at the position of a magnetic sensor. Furthermore, the connecting members are arranged in such a manner that Fsum and Fdiff in Formula (14) above satisfy the relationships Fsum<K and Fdiff<K, with respect to the predetermined required value K. As a result of this, it is possible to obtain an electric drive device which is capable of detecting the angular position of the rotor of the motor, with high accuracy, without adding a new component.

In the first and second embodiments, the first connecting member 101 and the second connecting member 102 are arranged in parallel with the x axis, but similar effects are obtained if these members are arranged in parallel with the y axis. Furthermore, since the distance between the three connecting wires of the first connecting member 101, and the distance between the three connecting wires of the second connecting member 102, are sufficiently smaller than the distance to the magnetic sensor 31, then a similar effect is also obtained if the first connecting member 101 and the second connecting member 102 are arranged in concentric fashion with the magnetic sensor 31.

Furthermore, in the first and second embodiments, it is assumed that the phase delay Δθ=π/6, but the phase delay Δθ is not necessarily π/6 and may be in the range of π/6±π/12. More specifically, Formulas (8), (9), (13) and (14) above are calculated so as to obtain a maximum effect when the phase delay Δθ=π/6, but as is clear from the rate of change of the trigonometric functions in these functions, provided that the phase delay Δθ is in a range of π/6±π/12, in other words, π/12≤Δθ≤π/4, then although the effects are limited compared to when Δθ=π/6, it is possible to obtain a certain beneficial effect.

The invention claimed is:

1. An electric drive device, comprising:
a first armature coil having three phases in which current phases are mutually separated by 2π/3;
a first inverter for applying voltage to the first armature coil;
a first connecting member having three connecting wires which connect the first armature coil and the first inverter;
a second armature coil having three phases in which the current phases are delayed by a phase delay of Δθ in a range of π/6−π/12≤Δθ≤π/6+π/12, relative to the first armature coil;
a second inverter for applying voltage to the second armature coil;
a second connecting member having three connecting wires which connect the second armature coil and the second inverter; and
a magnetic sensor arranged between the first connecting member and the second connecting member and detecting an angle of rotation of a rotor on the basis of change in a magnetic field generated by rotation of the rotor, wherein
following three sets of connecting wires, which are sets of connecting wires of the first connecting member and connecting wires of the second connecting member, are arranged in linear symmetry with respect to each other, with an x axis, which is an axis of detection of the magnetic sensor, being an axis of symmetry:
a first set of connecting wires: a set comprising one connecting wire B of the first connecting member, and a connecting wire of the second connecting member which has a current phase that is delayed by the phase delay of Δθ relative to the connecting wire B;
a second set of connecting wires: a set comprising a connecting wire A of the first connecting member which has a current phase that is advanced by 2π/3 relative to the connecting wire B, and a connecting wire of the second connecting member which has a current phase differential greater than the phase delay Δθ relative to the connecting wire A;
a third set of connecting wires: a set comprising a connecting wire C of the first connecting member which has a current phase that is delayed by 2π/3 relative to the connecting wire B, and a connecting wire of the second connecting member which has a current phase differential greater than the phase delay Δθ relative to the connecting wire C, and wherein
when another axis of detection of the magnetic sensor, which is orthogonal to the x axis, is defined as a y axis, and angles formed between the y axis and straight lines which link the magnetic sensor with the connecting wire A, the connecting wire B and the connecting wire C are respectively defined as θa, θb and θc, then $$F\text{sum}=\sin(2\theta a+\pi/4)-\sin(2\theta b-\pi/12)+\sin(2\theta c-5\pi/12),$$
and
$$F\text{diff}=\sin(2\theta a-\pi/4)-\sin(2\theta b+\pi/12)+\sin(2\theta c+5\pi/12)$$

satisfy relationships Fsum<K and Fdiff<K with respect to a required value K which is determined on the basis of a tolerance value for torque ripples included in output torque.

2. The electric drive device according to claim 1, wherein, in four quadrants divided by the x axis and the y axis,
the connecting wire A and the connecting wire C are arranged in different quadrants; and
the connecting wire B is arranged between the connecting wire A and the connecting wire C at a position further towards a side of the connecting wire A than an intermediate position between the connecting wire A and the connecting wire C.

3. The electric drive device according to claim 1, wherein, in four quadrants divided by the x axis and the y axis,
the three connecting wires of the first connecting member are arranged in the same quadrant; and
in four quadrants divided by two straight lines at equal distances from the x axis and the y axis,
the connecting wire A and the connecting wire B are arranged in different quadrants; and
the connecting wire C is arranged between the connecting wire A and the connecting wire B at a position further towards a side of the connecting wire A than an intermediate position between the connecting wire A and the connecting wire B.

4. The electric drive device according to claim 1, wherein the phase delay Δθ is Δθ=π/6.

5. An electric drive device, comprising:
a first armature coil having three phases in which current phases are mutually separated by 2π/3;
a first inverter for applying voltage to the first armature coil;
a first connecting member having three connecting wires which connect the first armature coil and the first inverter;
a second armature coil having three phases in which current phases are delayed by a phase delay of Δθ in a range of π/6−π/12≤Δθ≤π/6+π/12, relative to the first armature coil;
a second inverter for applying voltage to the second armature coil;
a second connecting member having three connecting wires which connect the second armature coil and the second inverter; and
a magnetic sensor arranged between the first connecting member and the second connecting member and detecting an angle of rotation of a rotor on the basis of change in a magnetic field generated by rotation of the rotor, wherein
following three sets of connecting wires, which are sets of connecting wires of the first connecting member and connecting wires of the second connecting member, are arranged in point symmetry centered on the magnetic sensor:
a first set of connecting wires: a set comprising one connecting wire B of the first connecting member, and a connecting wire of the second connecting member which has a current phase that is delayed by the phase delay of Δθ relative to the connecting wire B;
a second set of connecting wires: a set comprising a connecting wire A of the first connecting member which has a current phase that is advanced by 2π/3 relative to the connecting wire B, and a connecting wire of the second connecting member which has a current phase differential greater than the phase delay Δθ relative to the connecting wire A;
a third set of connecting wires: a set comprising a connecting wire C of the first connecting member which has a current phase that is delayed by 2π/3 relative to the connecting wire B, and a connecting wire of the second connecting member which has a current phase differential greater than the phase delay $\Delta\theta$ relative to the connecting wire C, and wherein when another axis of detection of the magnetic sensor, which is orthogonal to an x axis, is defined as a y axis, and angles formed between the y axis and straight lines which link the magnetic sensor with the connecting wire A, the connecting wire B and the connecting wire C are respectively defined as $\theta a$, $\theta b$ and $\theta c$, then $$F\text{sum}=\sin(2\theta a+\pi/4)+\sqrt{2}\sin(\pi/12)\sin(2\theta b+\pi/4)-\sqrt{2}\cos(\pi/12)\sin(2\theta c+\pi/4); \text{ and}$$

$$F\text{diff}=\sin(2\theta a-\pi/4)+\sqrt{2}\sin(\pi/12)\sin(2\theta b-\pi/4)-\sqrt{2}\cos(\pi/12)\sin(2\theta c-\pi/4)$$

satisfy relationships Fsum<K and Fdiff<K with respect to a required value K which is determined on the basis of a tolerance value for torque ripples included in output torque.

6. The electric drive device according to claim 5, wherein, in four quadrants divided by the x axis and the y axis, the connecting wire A and the connecting wire B are arranged in different quadrants; and the connecting wire C is arranged between the connecting wire A and the connecting wire B at a position further towards a side of the connecting wire C than an intermediate position between the connecting wire A and the connecting wire B.

7. The electric drive device according to claim 5, wherein, in four quadrants divided by the x axis and the y axis, the three connecting wires of the first connecting member are arranged in the same quadrant; and in four quadrants divided by two straight lines at equal distances from the x axis and the y axis, the connecting wire A and the connecting wire B are arranged in different quadrants; and the connecting wire C is arranged between the connecting wire A and the connecting wire B at a position further towards a side of the connecting wire A than an intermediate position between the connecting wire A and the connecting wire B.

8. The electric drive device according to claim 5, wherein the phase delay $\Delta\theta$ is $\Delta\theta=\pi/6$.

* * * * *